Nov. 28, 1961 E. W. MOLLOY 3,011,059
TRIGGERING AND MEASURING CIRCUIT FOR RADIATION
INTEGRATION AND OTHER PURPOSES
Filed May 7, 1952 3 Sheets-Sheet 1

INVENTOR.
EVERETT W. MOLLOY
BY HIS ATTORNEYS.
HARRIS, KIECH, FOSTER & HARRIS

Nov. 28, 1961 E. W. MOLLOY 3,011,059
TRIGGERING AND MEASURING CIRCUIT FOR RADIATION
INTEGRATION AND OTHER PURPOSES
Filed May 7, 1952 3 Sheets-Sheet 2

INVENTOR.
EVERETT W. MOLLOY
BY HIS ATTORNEYS.
HARRIS, KIECH, FOSTER & HARRIS

3,011,059
TRIGGERING AND MEASURING CIRCUIT FOR RADIATION INTEGRATION AND OTHER PURPOSES

Everett W. Molloy, Wilmar, Calif., assignor to Beckman Instruments, Inc., South Pasadena, Calif., a corporation of California
Filed May 7, 1952, Ser. No. 286,497
21 Claims. (Cl. 250—83.6)

My invention relates to triggering and measuring circuits and more particularly to circuits responsive to a relatively slowly varying input signal to trigger a discharge at a predetermined level of the input signal. It will be described with particular reference to an instrument adapted for the detection and integration of nuclear radiation, it being recognized that this is merely exemplary of many other uses of the circuit.

It is a general object of the invention to solve the problem of producing a useful output of relatively high level from an effectively D.C. input signal, particularly a D.C. input signal of extremely low level, such as occurs in the measurement of nuclear and other radiation by means of ionization chambers. It is a further general object to obtain the relatively high-level output signal in the form of a triggered electrical discharge when the input signal reaches a predetermined level and to provide a novel triggering circuit in which the output stage is a gas discharge tube, the input stage being a suitable control element such as a grid-controlled thermionic tube.

A further object of the invention is to provide a novel counting and indicating means for the discharges; also to meter the discharges by a novel circuit economical of battery power and adaptable to a portable instrument of minimum bulk and weight, preferably of pocket size.

As is well known, the accurate measurement of extremely small current signals imposes severe requirements upon the input tube. Among others is the requirement of extremely small grid current. Both the type of tube which must be selected for low grid current characteristics and the necessary conditions of operation set an upper limit to output power available from the single tube. This limit is necessarily small compared to power available from a single tube used in other applications not restricted to small current signals, and is inadequate, for example, to operate a relay, except one of relatively high sensitivity and small mechanical power. The embodiment of the invention to be exemplified requires the use of a relay of substantial mechanical power capable of operating a mechanical counting mechanism. A second vacuum tube is not feasible for added power gain because the added operating power requirement, particularly the added standby power required to operate the extra filament, results in a larger and heavier battery or shortened battery life.

An important object of the invention is to provide a circuit capable of actuating a relay of substantial mechanical power, yet requiring a minimum number of tubes and only a single stage employing an electrically heated cathode. A related object is to provide an instrument of particularly small electrical operating power requirement both in respect to standby electrical power requirement and electrical power requirement upon active response to signal, whereby maximum economy is obtained in weight and bulk of the battery complement. In this connection, it is an object of the invention to employ a cold cathode gas discharge tube, preferably of the triode type, as a second or power stage having no filament current requirement.

The input signal is often derived from a slowly discharging input capacitor connected to the control element, e.g., to the grid of a vacuum tube. For example, in the measuring of nuclear radiation, a precharged input capacitor may be slowly discharged by the current induced in an ionization chamber exposed to the radiation. When the input signal reaches a predetermined level, it triggers the discharge. It is an object of the present invention to employ an input capacitor as the signal-producing means; also to employ the discharge or output signal to recharge the input capacitor.

It is also an object of the present invention to employ an output capacitor which discharges through the load and through the gas discharge tube, yet which is connected in a circuit providing for rapid recharge of this capacitor following each discharge.

It is a further object of the invention to employ a relay in the discharge circuit and to cause this relay to actuate an indicating or counting device which counts the number of discharges. It is a further object to employ such a relay for recharging the input capacitor.

In prior practice, cold-cathode gas discharge tubes have typically been operated with relatively fixed potential differences between cathode and anode, the tube being triggered by the superimposing of an actuating signal in the form of a pulse on one of the electrodes, typically a third, trigger or "starter" electrode, also otherwise held at a fixed potential relative to the other electrodes. This may be accomplished by A.C. coupling, e.g., by way of a transformer or coupling capacitor. In such an arrangement, aside from the inconvenience of adapting an input signal, which may be changing but slowly, to provide a trigger pulse for the gas tube, a difficulty is that the indicator will be triggered only once even though the input signal is sustained above the response threshold. Thereafter, no further indication or repetition of signal is produced unless added power provision allows for a continuously maintained discharge. As mentioned above, it is feasible to have the momentary discharge actuate some device, such as a relay, to recharge the input capacitor, but if for any reason the input capacitor should not be recharged, then, again, no further pulse indication is obtained even though radiation level may remain high. It is an object of the invention to produce a repeated output discharge cycle and to maintain this so long as the input signal remains above the predetermined level.

The present invention circumvents the above-mentioned difficulties by use of a novel D.C. coupling between the input and power stages. Numerous difficulties arise when this is attempted, according to past practices and understandings, since a difficult combination of conditions must be met. The direction of signal change at the input must be of the proper sign and must be accomplished without the use of extra stages for the purpose of inversion. The available supply voltage must be efficiently employed to provide the necessary range of voltage change at the triggering electrode of the gas tube; also the necessary voltage for the ionization chamber, if employed. Stability must be maintained in the operation of the input tube, assuring constancy of the threshold value of input potential. Simplicity of arrangement for charging the input capacitor must not be sacrificed. It is an object of the present invention to provide a circuit overcoming such difficulties and meeting such requirements; also to provide a circuit in which the gas discharge tube is triggered by a change in cathode potential induced by the input stage and the signal applied thereto.

Separate and independent time constants are encountered in the input charging circuit and in the storage capacitor charging circuit. Care should be taken to make the recharge time of the storage capacitor sufficiently short to assure a condition of full charge before the trigger signal arrives. Otherwise, if the input capacitor discharge time is relatively short, as at high radiation intensities, the output may be triggered before the storage capacitor is adequately charged, resulting in failure to actuate the signalling or load means, e.g., the output relay. At the same time, the time constant in the output circuit cannot be reduced below certain practical limits, due to the requirement of isolating the storage capacitor from the source with a decoupling impedance large enough to insure extinction after discharge. It is an object of the present invention to overcome such difficulties.

It is another object of the invention to recharge the input capacitor in a novel manner by current flow through the input stage. Another object of the invention is to add an increment of charge to the output capacitor just before discharge of the gas tube. A further object is to add this increment of charge as a result of change in plate current of the input tube. Still a further object is to use this change in input tube plate current to increase the potential difference between the anode and cathode of the gas discharge tube and thus effect firing thereof.

The embodiment to be particularly described is a radiation measuring device of a type intended for distribution from a field station. The instrument is turned on and is preset at the field station as concerns scale range and alarm threshold. It is then locked and distributed to personnel requiring protection in potentially dangerous areas. The immediate user is given the option merely of selecting the type of alarm signal desired or of turning the alarm off. It is an object of the invention to provide a radiation integrator of the alarm type having one or more of these features.

It is a further object of the invention to use the discharges in the gas tube to actuate a counter mechanism in a step by step manner. This may be accomplished by use of an output relay actuating an escapement which controls the movement of a ratchet wheel, it being an object to provide such a system and to display a scale, usually on or operatively connected to the ratchet wheel, through a window of the housing for observance of the then-integrated radiation. It is another object of the invention to recharge the input capacitor in step with the operation of such an escapement, but to provide a system in which this input capacitor is not recharged before the escapement action has been assured of being complete.

A further object of the invention is to provide a radiation measuring instrument that will "fail safe." Thus, any cause of failure or faulty operation in the critical, high-impedance portion of the circuit will cause the instrument to increase the indicated apparent radiation level, thereby giving an almost immediate or a premature alarm signal, as compared with an instrument which falsely indicates lower than actual radiation or which fails entirely to respond if its operation becomes faulty. In the present instrument, short-circuits or lowered impedance in the ionization chamber, input capacitor, input tube, etc., which tend to raise the input grid potential, will act on the instrument in the same manner as will increased radiation.

A further object of the invention is to provide a radiation alarm which can be set to respond in widely different ranges of integrated radiation. In this connection, it is an object to provide a multiple-scale instrument with a novel means for covering unused scales or portions thereof. Another object is to combine the covering or uncovering functions with a switching operation whereby the instrument is changed in sensitivity or in range of radiation response.

Further objects and advantages of the invention will be evident from the herein-contained description of an exemplary embodiment, representing a pocket alarm of the type previously discussed.

Referring to the drawings.

Figure 1:
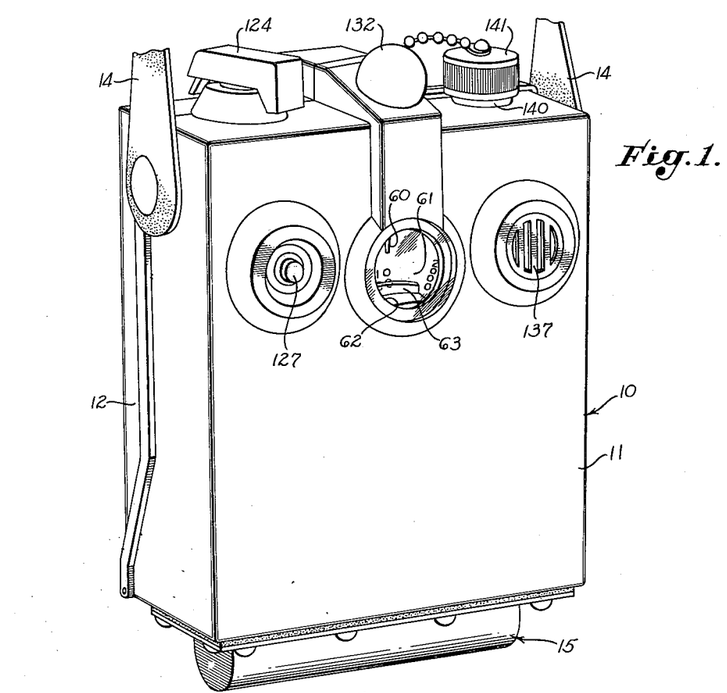
FIG. 1 is a perspective view of the pocket alarm with the housing in closed and locked position.
Figure 3:
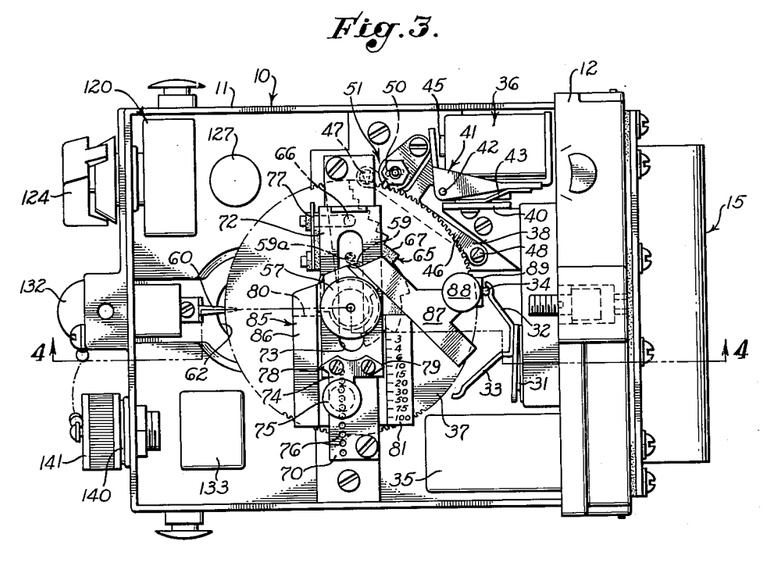
FIG. 3 is an elevational view of the device with the cover opened.
Figure 4:
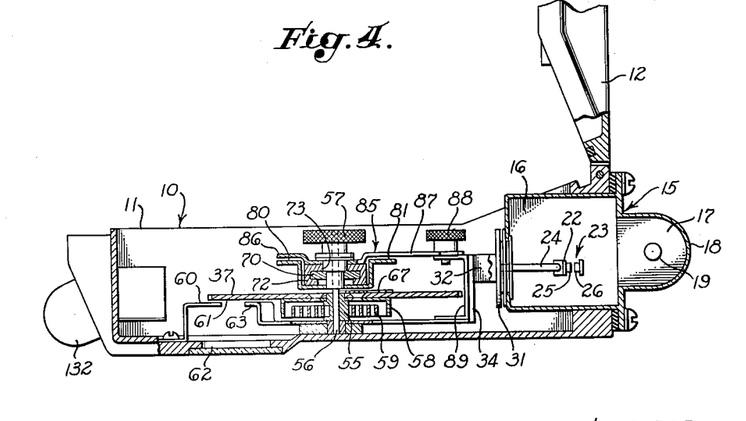
FIG. 4 is a longitudinal cross-sectional view taken along the line 4—4 of FIG. 3.

Referring particularly to FIGS. 1, 3 and 4, the pocket alarm includes a housing 10 formed of a case 11 to which is hinged a cover 12 lockable in closed position by means not shown. The housing 10 is of such size as to be placed within a pocket. For protective purposes, it may be attached by elements 14 to a shoulder strap, not shown.

Carried by the case 11 at its lower end is an auxiliary housing 15 providing a sealed compartment 16. That portion of the compartment 16 which extends outside the case 11 comprises an ionization chamber 17 representing the space between an arched portion 18 of the housing 15 and a collecting electrode 19, the latter being insulated from the housing by conventional means.

Contained within that portion of the sealed compartment 16 disposed inside the case 11 is the control element of the first stage, illustrated as a thermionic input tube 30 to be described, and also two input capacitors 20 and 21 of the polyethylene type, one plate of the capacitor 20 being connected to the collecting electrode 19. An actuating arm 24 operates a range switch 23 within the auxiliary housing 15, the latter being suggested by the dotted rectangle in the wiring diagram of FIG. 5. Action of the range switch 23 serves to connect one plate of the capacitor 21 additionally to the collecting electrode 19 or to disconnect this capacitor therefrom.

Figure 2:
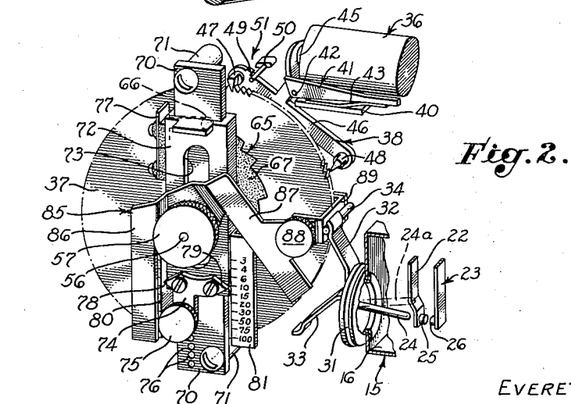
FIG. 2 is a diagrammatic perspective view of the operating mechanism of the device.

As best shown in FIG. 2, the actuating arm 24 may occupy one of two positions, either a lower position, as shown by solid lines, or an upper position, as shown by dotted lines 24a. The range switch 23 comprises a resilient member 22 carrying a movable contact 25 and a separately mounted fixed contact 26. When the actuating arm 24 is in the lower position, as shown, the switch 23 is open and the capacitor 20 alone is connected to the collecting electrode of the ionization chamber. In its upper position 24a, the actuating arm 24 urges the resilient member 22 in a direction to engage the contacts 25 and 26, whereby the capacitor 21 is additionally connected to the collecting electrode. The lower position of the actuator arm 24 thereby provides for a lower input capacitor to be connected to the circuit, corresponding to a low range scale, while the upper position of the arm 24 adds an additional larger capacitor, changing instrument response to correspond to a high range scale.

To actuate the arm 24 from a position outside the sealed compartment 16, this arm is shown connected to the closure member of a shallow bellows 31 sealed to the auxiliary housing 15. Also connected to this closure member are arms 32 and 33 having arcuate sockets in their outer ends for respective reception of a rod 34 attached to a portion of the mechanism to be hereinafter described.

Mounted in the case 11 near the bottom is the power tube, shown as a cold cathode gas discharge tube 35, functioning as heretofore outlined and connected as hereinafter described. Suffice it to say here that this tube fires and creates a discharge which actuates the load means, shown as a relay 36, which in turn advances a toothed ratchet wheel 37 in a step by step manner through an escapement 38.

As most easily understood from FIG. 2, the relay is mounted on a bracket 40 and provides an L-shaped armature 41 pivoted at 42. One arm of the armature is biased into the position shown in FIG. 2 by a leaf spring 43 carried by the bracket 40, thus urging the other arm of the armature away from the core 45 of the relay. The escapement 38 is directly connected to the armature to pivot about the point 42. This escapement comprises a pawl arm 46 carrying the usual dogs 47 and 48. When the relay 36 is energized, the pawl arm 46 is rocked clockwise, as viewed in FIG. 2, lifting the dog 47 from its tooth after the dog 48 enters an inter-tooth space. Upon de-energization of the relay, the pawl arm 46 is moved counterclockwise by the spring 43 to lift the dog 48 and re-seat the dog 47. In conventional escapement action, the toothed wheel 37 biased as hereinafter described, advances counterclockwise one step as a result of this cycle of operations.

At the extreme clockwise position of the pawl arm 46, a movable contact 49 thereof engages a fixed contact 50 of a capacitor charging switch 51. The input capacitor 20, or the combination of capacitors 20 and 21, is charged only when the capacitor charging switch 51 is closed. Should there be any particle of dirt, ice, etc., which would temporarily prevent the dog 48 from entering its inter-tooth space, the switch 51 will not close and, by circuitry to be described, the relay 36 will be repeatedly energized to rock the pawl arm 46 back and forth in a manner tending to dislodge any such particle.

The toothed wheel 37 is a metallic disc fixed to a hub 55 (FIG. 4) and to a shaft 56 which carries a zeroing knob 57 disposed within the housing 10 when closed. The toothed wheel 37 carries a cupped element 58 within which is a spiral spring 59 biasing the toothed wheel 37 for counterclockwise movement between stop means, not shown, permitting the toothed wheel to move through an angle of approximately 330°. The inner end of the spring is fixed to the hub 55, the outer end being anchored to a fixed pin 59a (FIG. 3). If the zeroing knob 57 is turned clockwise to wind the spring and engage one stop means, it will be at an initial or zero position. At this time, the zero position can be read by observing the relationship between an indicator 60 and an integration scale 61 disposed on the toothed wheel 37 and viewable through a window 62 of the case 11 in a manner suggested by FIG. 1. Each of the index lines of this scale 61 is indicated by a number composed of digits arranged radially of the toothed wheel, representing a scale, about zero, of 1–2000 R. Each count accordingly represents an integrated radiation of 10 R. units. The highest digit of each number at the inner radial position is arranged, however, to be coverable by a movable shield 63. When such innermost digits are thus covered, the scale, above zero, will be observable through the window 62 as 1–200 R., and each count therefore represents 1 R. With a wheel 37 having 220 teeth, such a scale of 200 counts will prevent the face-on appearance in the window 62 of either end of the scale while the other extreme end is still visible.

The stop means determining the maximum "unwound" position of the toothed wheel will be set to dispose the scale digits 2000 opposite the indicator 60. Correspondingly, the indicator will record 200 impulses before hitting a stop. On the other hand, it is desirable that an alarm be given at some fraction of the total count possible. For example, a maximum alarm point at 100 counts is desirable, permitting a total exposure count to be obtained for statistical purposes while warning the wearer to return to safe areas upon sounding of the alarm.

The invention provides for the sounding of the alarm at any one of a number of preset values of integrated radiation. This is accomplished by use of a novel alarm switch 65 including a radially shiftable contact 66 (FIG. 3) engageable, in a switching or alarm position, with the metal of the toothed wheel 37. In non-alarm positions, the contact 66 rides on an insulating member 67 (FIGS. 2–4) which may represent a patterned film of insulating material applied to one face of the toothed wheel 37 or which may be a patterned sheet of insulating material adhered thereto. The pattern of the insulating member 67 is stepped such that it is of different arcuate length at different radial positions so that the alarm circuit is closed when the contact 66 rides off the insulating member 67 at the particular radial position at which the contact 66 is set, the contact 66 always resting upon the insulating member 67 when the toothed wheel 37 is in its zero or wound position.

Provision is made for changing the radial position of the contact 66 in steps corresponding to the radial position of the various steps of the insulating member 67. In this connection, a fixed cross bar 70 straddles the toothed wheel 37, being mounted on spacers 71 shown in FIG. 2. Sliding along this cross bar is a carriage 72 of semi-box shape to encircle partially the cross bar. The carriage provides a slot 73 receiving a projection of the zeroing knob 57. The carriage provides also a bar 74 threadedly receiving the shank of a setting knob 75 insertable into a selected one of a series of openings 76 in the cross bar 70. The contact 66 is attached to the carriage by a terminal structure 77, the setting knob 75 positioning the contact 66 at any selected radial position relative to the insulating member 67, this being done at the field station before the instrument is locked.

To indicate the alarm position at which the instrument is set, the bar 74 carries indicators 78 and 79 respectively moving opposite alarm scales 80 and 81 calibrated in units proportional to the arcuate movement of the toothed wheel necessary to close the alarm circuit at the different radial positions. The scale 81 indicates a typical arrangement in which the alarm point may be selected from ten available steps, namely, 3, 4, 6, 10, 15, 20, 30, 50, 75 and 100 for 1 R. increments. The scale 80 corresponds except that the scale markings are multiplied by ten to accommodate the 10 R. increments when both input capacitors 20 and 21 are in the input circuit.

The invention provides means for shifting from one range to another in a novel and fool-proof manner. In this connection, the invention provides a rotationally shiftable member 85 rotatable on an extension of the zeroing knob 57 and providing scale-covering arms 86 and 87. A scale changing knob 88, carried by the arm 87, permits shifting the arms from the position shown, in which the arm 86 covers the scale 80, to an alternate position in which the arm 86 uncovers the scale 80, and the arm 87 covers the scale 81.

The arm 87 carries a link 89 to which is connected the rod 34, this link extending to the far side of the toothed wheel 37 and there carrying the movable shield 63, the latter pivoting about the axis of the shaft 56. The arrangement is such as to move the movable shield 63 out of the window 62, to expose the innermost digits of the scale 61, when the shiftable member 85 is rotated to expose the higher scale 80. When the apparatus is in the position shown in FIG. 2, the rod 34 seats in the arcuate socket of the arm 32 causing the actuating arm 24 to move to a position allowing the contacts 25 and 26 to be disengaged. This provides for the input capacitor 20 only in the input circuit. When the shiftable member 85 is turned to its other position, the rod 34 seats in the arcuate socket of the arm 33, thus causing engagement of the contacts 25 and 26 to dispose both input capacitors 20, 21 in the input circuit to provide the higher range then indicated both on the scale 61 and the scale 80.

Figure 6:
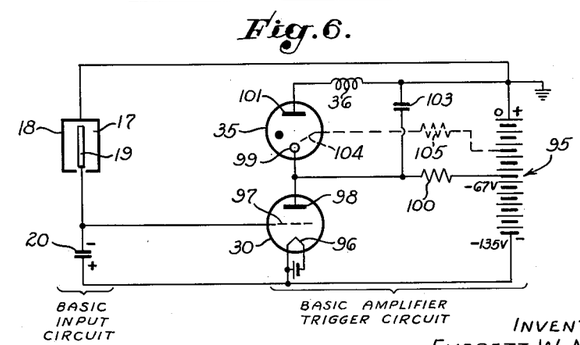
FIG. 6 is a simplified wiring diagram illustrating the basic triggering circuit.

The fundamental components of the triggering circuit can be best understood by reference to the simplified wiring diagram of FIG. 6 in which the basic input circuit includes the ionization chamber 17 connected serially with the input capacitor 20 across a voltage supply shown as a battery 95 with its positive terminal grounded to the case and arbitrarily referred to hereinafter as at zero potential, the negative terminal being connected to the capacitor 20 and to the separately-energized circuit for the cathode 96 of the input tube 30. This input tube is here shown as a triode having a control grid 97 and a plate or anode 98. The gas discharge tube 35 is shown as having its cathode 99 directly connected to the plate 98, both of these tube elements being connected through an impedance, such as a resistor 100, to an intermediate point of potential on the battery 95. It will be observed that the resistor 100 is common to the output circuits of the tubes 30 and 35. The gas discharge tube 35 is shown as having an anode 101 connected through the winding of the relay 36 to the positive terminal of the battery 95. An output capacitor 103 is connected across the serially-connected tube 35 and relay 36 to form a part of a discharge circuit for the gas tube 35. This gas tube 35 is indicated as a two-element tube, but use of a three-element tube is often desirable. The third or the normal control element 104 would then not be used as the control element in the conventional manner but would be connected in series with a current-limiting resistor 105 to some point of stable potential on the battery 95, preferably at a point not below the point of connection of the resistor 100, the connections for the third element being shown by dotted lines which indicate optional use thereof.

It will be noted that the input tube 30 and the resistor 100 effectively form a potential divider across two suitable points of potential on the battery. It should be noted also that the upper section of the battery 95 will charge the output capacitor 103 through the resistor 100 and will maintain a potential difference between the cathode 99 and the anode 101 of the output tube, albeit this potential difference is not sufficient to cause firing of this tube. If, however, the potential of the cathode 99 is made somewhat more negative, the tube will fire and the output capacitor 103 will send a short current surge through the relay 36 and the tube 35 to actuate the former. The tube 35 will immediately recover. It will thus be observed that in the present invention the cathode 99 is effectively the control electrode for the tube 35.

Assuming that the capacitor 20 is precharged by any suitable means so that its upper plate is negative relative to its lower plate, it will be apparent that the control grid 97 of the input tube will be negative. While not necessary to the operation of the circuit, it is usually preferable thus to bias the control grid 97 below cut-off, representing a condition of no plate current in the input tube. Among other advantages, this permits of standby operation involving zero current demand upon the battery 95.

Ionizing radiation reaching the ionization chamber 17 initiates a flow of positive ions to the internal electrode 19. This gradually discharges the input capacitor 20 and makes the control grid 97 progressively more positive. If the grid was initially below cut-off, it will now be gradually raised to or above the conducting region, but in any event the input tube 30 will become more conductive than previously and the voltage applied to the plate 98 will be lowered to the extent of voltage drop in the resistor 100, or at least the added voltage drop in this resistor now produced by the plate current to the input tube 30. Expressed differently, the plate impedance of the input tube 30, one of the elements in the aforesaid potential divider, now is diminished, wherefore the potential difference between the plate 98 and the cathode 96 is decreased. Because the cathode 99 of the gas tube 35 is directly connected to the plate 98 of the input tube, this cathode likewise drops in potential or becomes more negative. The other elements of the gas tube, however, have been held at fixed potential so that the now increased potential difference across the elements of the gas tube 35 causes this tube to fire. It is to be noted that, under the preferred conditions of operation of the input tube, the plate current in this tube need only rise to a very small value, typically less than 25 microamperes, in order to trigger the output.

As long as the input signal is sustained adequately above cut-off, the gas tube 35 and its associated circuit elements act in the nature of a relaxation oscillator, the charge of the output capacitor 103, after firing, being restored at a time rate, preferably short, determined by the resistor 100. So long as the input tube 30 remains conducting and the cathode 99 remains at its more negative potential, the potential developed across the output tube by the upper section of the battery will cause it to fire successively, thus successively actuating the relay 36. If, however, the input capacitor 20 is immediately recharged, following the first discharge, as is the preferred mode of operation, there will be only one discharge, and this will be recorded by the counter through stepping of the toothed wheel because of a single relay actuation.

From what has been previously said, it will be apparent that, as long as the input signal remains at the necessary predetermined level, the repeated or cyclical energization of the relay 36 will repeatedly oscillate the pawl arm 46, thus tending to clear any inter-tooth obstruction which may be present and prevent completion of a cycle of escapement operation. The frequency of the pulses reaching the relay will depend upon the time constant of the output tube circuit. The oscillation of the pawl arm 46 will tend to clear any obstruction, at which time the contacts 49 and 50 of the input capacitor charging switch 51 will be closed, thus quickly recharging the input capacitor through circuits to be described and thus returning the output tube 35 to a passive, standby condition until again the input signal reaches or exceeds the predetermined level.

In other applications of the circuit, not involving recharge of an input capacitor, the oscillatory nature of the gas tube and associated circuit elements assures repeated signalling of an alarm, rather than a single momentary signal only, when the input signal exceeds and is sustained above the predetermined level.

It is important to notice that the voltage of the upper section of the battery 95 applied to the discharge tube 35 is not in itself sufficient to fire this tube; also that the output capacitor 103 is not charged to a firing potential exclusively by this upper section of the battery. This output capacitor is initially charged by such upper section but is additionally charged, preparatory to firing of the tube 35, because of decrease in plate potential of the tube 30 which results from the grid 97 becoming more positive as the input capacitor 20 is discharged by the ionization chamber. If the grid 97 is below cut-off, the supplemental charging of the output capacitor 103 waits upon and occurs only when the input tube becomes conductive. By this means, the difficulties mentioned earlier due to separate time constants in the input and output circuits are eliminated. The charging cycles for the input capacitor 20 and the output capacitor 103 are held completely in step, since both are intimately coupled by the action of the input tube 30. Accordingly, the problem can never arise of insufficient charge in the capacitor 103 at the moment the input signal reaches threshold level.

Figure 5:
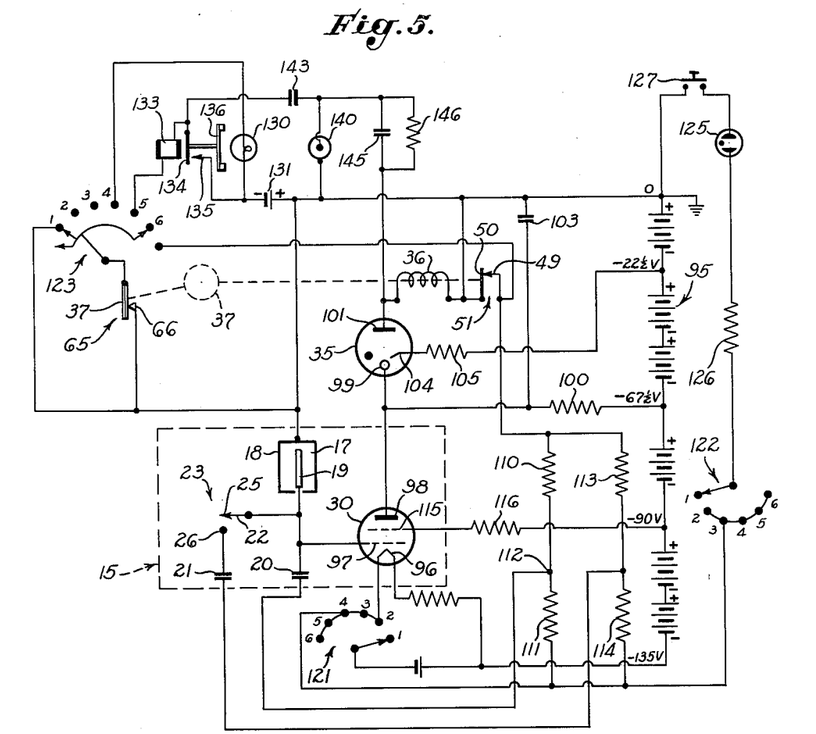
FIG. 5 is a wiring diagram of the pocket alarm of FIGS. 1–4.

The preferred way in which the input capacitor is recharged is best shown in the complete wiring diagram of FIG. 5 which shows the battery 95 split up into various multi-cell units to produce voltages approximately as shown. Usually the battery sections are housed in the cover 12.

Considering the recharging of the input capacitor 20 by way of example, it is desirable that the recharging be effected by connecting the low impedance side of the capacitor to a point which is, for example, 50–75 volts positive with respect to the cathode 96. The grid 97 of the tube 30 will then draw current in the manner of a diode until the grid potential reaches equilibrium, typically about 1 volt negative. The low impedance end of capacitor 20 is then returned to the potential of the cathode 96, thus biasing the tube negatively by the voltage now existing across the capacitor, substantially equal to the 50-75 volts of charging potential. The grid should be drawn negative very rapidly to maintain the quantity of charge stored on the capacitor during the charging cycle. However, the charging circuit to be described responds in a matter of milliseconds so that the effect of the grid current is negligible.

This manner of recharging the capacitor 20 may be effected by use of a voltage divider composed of resistors 110 and 111 connected serially across the battery 95 or any selected portion thereof. As shown, the resistor 110 is connected to the positive terminal of the battery through the capacitor charging switch 51 actuated by the relay on completion of the escapement action. The resistor 111 is connected to the negative terminal of the battery through the cathode supply circuit for the tube 30. The low impedance side of the input capacitor 20 is connected to a point 112 between the resistors 110 and 111. If these resistors, forming the voltage divider, are of substantially equal resistance, the point 112 will be at approximately +67½ volts when the contacts of the switch 51 are momentarily closed. When these contacts are open, point 112 returns to cathode potential, there being then no current flow through the resistor 111. The net result of these operations is to recharge the input capacitor 20 in such manner as to swing the grid 97 negative, in this case far below cut-off, where it remains for a long period of hours in the absence of radiation reaching the ionization chamber 17.

The recharging of combined input capacitors 20 and 21 is preferably effected through an additional voltage divider including resistors 113 and 114. By proper selection of the resistors 110 and 113, a desired charge can be placed on input capacitor 20 alone or on combined capacitors 20 and 21, and the charge for the two cases can be conveniently and independently adjusted for accurate calibration of the two scale ranges.

In the complete wiring diagram of FIG. 5, the input tube 30 is shown as a screen grid tube having a screen 115 connected through a resistor 116 to a point on the battery intermediate the points of connection of the plate 98 and cathode 96. FIG. 5 also shows the gas discharge tube 35 with the third element 104 connected as previously described but not used as the trigger means for the tube.

It is desirable to permit the operator to be able to turn the instrument on and off and to select the type of alarm desired. This is accomplished by use of a selector switch 120 (FIG. 3) having three ganged six-position switches 121, 122 and 123 (FIG. 5). The selector switch is operated by a knob 124 (FIGS. 1 and 3) to assume any one of six positions. The first position is an "Off" position in which the switch 121 interrupts the cathode-energizing circuit of the tube 30, this circuit being closed in all other switch positions, and in which the switch 122 interrupts the circuit to a neon lamp 125. This neon lamp is used to illuminate the integrating scale 61 in the vicinity of the window 62 under conditions of low ambient light. It is connected serially across the battery 95 through the switch 122, which is closed in all positions above the first, and through a resistor 126 and a pushbutton switch 127 exposed to the exterior of the case as shown in FIG. 1. This latter switch permits the operator to energize the neon lamp 125 at all positions of the switch 122 above the first, with the dual result of illuminating the integrating scale 61 and testing the battery 95. The neon lamp will not become illuminated if the battery potential is unduly low or if the battery has failed. When the selector switch 120 is in its first position, the six-position, three-wiper switch 123 opens all of the alarm circuits to be described.

The second position of the selector switch 120 is a "Charge" position, offering a means for initially charging the input capacitor or recharging it at any selected time.

In the second position of the switch 123, the first and third interconnected wipers effectively form a shunt circuit across the contacts 49 and 50 of the capacitor charging switch 51, thus charging the input capacitor independently of the relay-operated switch.

The third position of the selector switch 120 is an "Alarm Off" position. In this position, all alarm circuits are de-energized but the instrument will function to integrate incident radiation.

The fourth position of the switch 123 is a "Visual Alarm" position. The second wiper of this switch then connects the alarm switch 65 to an electric bulb 130 in series with a battery 131. This bulb 130 is disposed inside a transparent housing 132 (FIG. 1) to give a visual alarm when the contact 66 of the alarm switch 65 rides off the insulating member 67 and engages the toothed wheel 37.

The fifth position of the switch 123 is a "Visual and Aural Alarm" position in which the first and second wipers of the switch 123 respectively engage the fourth and fifth contacts thereof to connect the alarm switch 65 to the bulb 130, as before, and also to the winding of a buzzer 133. This buzzer includes an armature 134 and the usual make-and-break contact 135 connected to be energized by the battery 131 when the alarm switch 65 is closed. The oscillation of the armature 134 is transmitted directly or indirectly to a diaphragm 136 closing an aperture of the case 11 and covered by a protective grill 137 (FIG. 1). This gives a relatively loud aural alarm.

If an aural alarm through earphones is desired, a pair of earphones can be connected to a plug 140 at the top of the case 11 and normally closed by a protective screw-type cover 141 (FIG. 1). The plug 140 is of the microphone type with its outer terminal connected to the instrument case, shown as a grounded conductor in FIG. 5. The inner terminal of this plug is capacitively connected through a capacitor 143 to the buzzer 133. The earphone thereby effectively takes its signal across the buzzer coil. The result is that the buzzer induces a sharp rasping sound in the earphones.

In addition, another type of aural signal is given prior to the closing of the alarm switch 65 and each time the tube 35 fires, assuming that the earphones are in use. This is due to the fact that the plug 140 is also connected capacitively through a capacitor 145 to the anode 101, this capacitor being shunted by a resistor 146. This signal takes the form of an intermittent musical pulse. The pulse is musical because the anode 101, dropping in voltage during discharge to the extent of voltage drop occurring in the relay, does not return smoothly, but tends to "ring" briefly, at a relatively high audio frequency determined by the magnitude of the capacitor 103 and the inductance of the relay. Thus, if a field of high-intensity radiation is suddenly encountered, the earphones will give warning through a series of musical notes suddenly becoming rapid prior to the alarm point.

In the event aural warning alone is desired, the switch 123 is moved to its sixth "Aural Alarm" position. This changes the conditions just described only by switching the bulb 130 from the circuit of the alarm switch.

By careful design, circuits of this type can be made to operate effectively over prolonged periods of time even with a small battery complement. In this connection, it is important to notice that the tube 30 need not be conducting during the time that the radiation is progressively discharging the input capacitor, if the input tube is operated below cut-off, as herein described, during standby operation. By careful insulation, the input capacitor can retain its charge in the absence of radiation for a period of twelve hours or more. It should be noted also that the gas discharge tube 35 remains non-conducting and non-consumptive of current until it is triggered, the aforesaid initial and supplementary charge imparted to the output capacitor 103 substantially entirely supplying the energy to pulse the relay 36 upon triggering of the output tube.

While the circuit of the invention has been exemplified with reference to the problem of radiation integration, it should be apparent that the circuit is well adapted to the triggering of an electric discharge at a predetermined level of any D.C. or slowly varying input signal. There are many instances in which it is desired to measure a change in charge on an input capacitor whether or not the capacitor is automatically recharged. The invention is well adapted to such uses and is also of general interest as a counter for input signals or signal fluctuations, particularly occurrence of fluctuations above a given signal level, and when it is desired to give a visible, aural or electrical signal after the occurrence of a predetermined number of such signals or fluctuations.

Various changes and modifications can be made without departing from the spirit of the invention.

I claim as my invention:

1. A circuit for triggering an electrical discharge at a predetermined level of an input signal changing in a progressive manner, said discharge taking place through an output circuit including a load means, said circuit including: a gas discharge tube having an anode and a cathode in said output circuit to produce said discharge therein; a source of potential; circuit means connecting said source of potential to said anode and said cathode, said circuit means including means for maintaining said anode more positive than said cathode and for causing said gas discharge tube to fire only when the potential of said cathode is made more negative, the cathode potential being the firing control for said tube, said circuit means including an impedance connecting said cathode to said source so that the cathode potential becomes more negative as the current through said impedance is increased; and a control means for increasing the current through said impedance as said input signal approaches said predetermined level to swing the cathode potential more negative and cause said tube to fire at said predetermined level of said input signal.

2. A circuit as defined in claim 1 in which said control means includes an output circuit, said impedance being connected serially in said output circuit, said control means including a control element receiving said input signal.

3. A circuit for triggering an electrical discharge at a predetermined level of a positively-increasing input signal to actuate a load device, said circuit including: a thermionic tube having a cathode and an anode connected in an output circuit, there being an impedance in said output circuit, said tube having a control grid normally biased negatively but connected to said input signal to become more positive as a result of said positively-increasing signal to cause an increase in current flow in said cathode-anode output circuit, the anode potential decreasing upon increase in current in said output circuit because of the presence of said impedance; and a gas discharge tube having an anode and a discharge-controlling cathode connected in a discharge circuit including said load device with the anode of said gas discharge tube more positive than the cathode thereof, the discharge-controlling cathode being connected to the anode of said thermionic tube to vary in potential upon decrease in said anode potential of said thermionic tube and reach a firing potential when said input signal reaches a predetermined level.

4. A circuit for triggering an electrical discharge at a predetermined level of a varying input signal, said circuit comprising: a thermionic tube providing a plate and a cathode connected in a plate-cathode output circuit, said tube providing a control grid for varying the current in said output circuit; means for supplying said varying input signal to said control grid to make said grid more positive and increase the current in said output circuit; an impedance in a portion of said output circuit, said impedance being connected to said plate to reduce the plate potential upon increase in plate current in said output circuit; a gas discharge tube providing a cathode and an anode connected in an output circuit, said impedance-containing portion being common to said output circuits, said cathode of said gas discharge tube being the control element therefor and being connected to said plate of said thermionic tube; and a source of potential connected in said output circuit of said gas discharge tube to maintain its anode more positive than its cathode, said reduction in plate potential upon increase in plate current increasing the potential difference between said anode and cathode of said gas discharge tube to cause this tube to fire when said input signal rises to said predetermined level.

5. A circuit for triggering an electrical discharge in an output circuit including a load means when an input signal varying in potential reaches a predetermined level, said circuit comprising: a source of potential; a cathode-triggered gas discharge tube providing an anode and a cathode connected to points of different potential on said source with the anode more positive than the cathode, the potential difference between such points being insufficient to cause said tube to fire, said tube being connected in said output circuit serially with said load means; an output capacitor connected across said serially-connected tube and load means with one terminal of such capacitor connected to said cathode, said capacitor being charged by said potential difference; and means for simultaneously increasing the potential difference between said anode and cathode and across said output capacitor as said input signal changes in potential toward said predetermined level, thereby charging said output capacitor additionally before such increasing potential difference causes said tube to fire and discharge said output capacitor through said load means.

6. A circuit as defined in claim 5 including means in said output circuit for producing repeated firing of said gas discarge tube so long as the increased potential difference between said anode and cathode is maintained, thus repeatedly energizing said load means.

7. A circuit as defined in claim 5 including an input capacitor supplying said input signal, said load means comprising a relay having contact means closing upon occurrence of said discharge, and including means for recharging said input capacitor upon closing of said contact means.

8. A circuit for triggering an electrical discharge at a predetermined level of a slowly-varying input signal as this signal swings positively, said circuit comprising: a thermionic tube providing a cathode and a plate connected in a plate circuit, said tube providing an input grid connected to receive said signal; a source of plate supply voltage; a potential divider connected across points of different potential of said source and comprising two serially connected impedances, said plate circuit forming one of said impedances whereby the voltage of said plate decreases with increased current in said plate circuit; a gas discharge tube providing a discharge-controlling cathode connected to said plate of said thermionic tube to follow changes in voltage of said plate; circuit means connecting said gas discharge tube to fire at a predetermined cathode potential, said signal swinging the potential of said grid more positively to change said plate potential and produce said predetermined cathode potential at said predetermined level of said input signal to cause said gas discharge tube to fire; and output load means responsive to the discharge current through said gas discharge tube.

9. A circuit as defined in claim 8 in which said circuit means of said gas discharge tube includes an output capacitor connected to said gas discharge tube for supplying a pulse of discharge energy thereto and to said load means upon firing of said gas discharge tube.

10. A circuit for triggering an electrical discharge at a predetermined level of a varying input signal, said circuit comprising: an input capacitor chargeable to produce said varying input signal; a thermionic tube providing a cathode and a plate connected in an output circuit and providing a control grid connected to said input capacitor to receive said varying signal, said input capacitor progressively swinging said grid more positively to increase the current in said output circuit; an impedance in the plate side of said output circuit to reduce the plate voltage upon increase in current in said output circuit; a gas discharge tube providing a discharge-controlling cathode connected to said plate of said thermionic tube to follow changes in voltage of said plate, said gas discharge tube providing an anode; a second output circuit maintaining said anode of said gas discharge tube more positive than said cathode and establishing a potential difference therebetween insufficient to cause said gas discharge tube to fire, said gas discharge tube firing when said potential difference is increased by reduction in said plate potential; a relay in said second output circuit providing contact means closing upon firing of said gas discharge tube; and means for recharging said input capacitor through said contact means during such closing thereof.

11. A circuit as defined in claim 10 in which said input capacitor is recharged by momentary flow of current between the cathode and control grid of said thermionic tube, said means for recharging said input capacitor including means for momentarily supplying to said input capacitor a potential more positive than the potential on said cathode of said thermionic tube.

12. A circuit for triggering an electrical discharge at a predetermined level of an input signal changing in a progressive manner and derived from an input capacitor, said circuit including: a sectional battery providing positive and negative terminals and an intermediate negative terminal; an impedance; a thermionic tube providing a cathode connected to said negative terminal, a plate connected through said impedance to said intermediate negative terminal, and a control grid connected to the high impedance side of said input capacitor, said capacitor being normally charged to swing said grid below cut-off, said progressively changing signal swinging said grid more positively to increase the plate current above cut-off, the potential of said plate decreasing with increased plate current because of said impedance; a gas discharge tube providing an anode connected to said plate and a discharge-controlling cathode connected to said positive terminal, the potential between said positive terminal and said intermediate negative terminal being insufficient to cause said gas discharge tube to fire, said discharge-controlling cathode becoming more negative upon increase in plate current to cause said gas discharge tube to fire at a predetermined level of said input signal; a relay connected between said anode of said gas discharge tube and said positive terminal, said relay providing contact means closing momentarily when said gas discharge tube fires; and means for recharging said input capacitor through said contact means upon closing thereof.

13. A circuit as defined in claim 12 in which said means for recharging said input capacitor includes a shunt circuit across two points on said battery, said shunt circuit including in series a resistive portion and said contact means and having a terminal at a potential more positive than the cathode potential of the thermionic tube, said terminal of said shunt circuit being connected to the low impedance side of said input capacitor whereby said input capacitor is quickly recharged upon closing of said contact means by current flow between the cathode and grid of said thermionic tube.

14. A radiation-integrating circuit for triggering an electric discharge at a predetermined level of a varying input signal, said circuit comprising: an ionization chamber providing a collecting electrode; a normally charged input capacitor providing one terminal connected to a point of stable potential and another terminal connected to said collecting electrode; a thermionic tube providing a cathode, a plate and a control grid, said control grid being connected to said other terminal of said input capacitor and to said collecting electrode, the charged input capacitor applying a negative pre-bias to said control grid, the potential of said control grid becoming more positive as said input capacitor is progressively discharged by said ionization chamber to produce said varying input signal to said control grid, the plate current of said thermionic tube increasing as said grid becomes more positive; an impedance in the plate circuit of said thermionic tube to reduce the potential of said plate as the plate current increases; a gas discharge tube providing an anode and a discharge-controlling cathode connected in a discharge circuit, said discharge-controlling cathode being connected to said plate; and a source of potential for maintaining said anode more positive than said discharge-controlling cathode and for developing therebetween a potential difference insufficient to cause said gas discharge tube to fire until the potential of this cathode is made more negative by increase in plate current, said discharge tube thus firing at a predetermined level of said input signal.

15. A radiation-integrating circuit as defined in claim 14 including a relay in said output circuit of said gas discharge tube, said relay providing contact means momentarily closing when said gas discharge tube fires, and including means for recharging said input capacitor through said contact means upon such momentary closing thereof.

16. A radiation-integrating circuit as defined in claim 14 including a relay in said output circuit of said gas discharge tube, a counting means, and means for operatively connecting said relay to actuate said counting means to count the discharges through said gas discharge tube.

17. A radiation-integrating circuit as defined in claim 14 including means for counting the number of discharges of said gas discharge tube, an alarm circuit, and means for closing said alarm circuit following a predetermined number of discharge counts.

18. In a radiation alarm, the combination of: a gas discharge tube providing an output circuit; a radiation-detection means; means for integrating the radiation received by said radiation-detection means; means for triggering said gas discharge tube from said integrating means each time a predetermined quantity of radiation has reached said radiation-detection means, thus causing said gas discharge tube to fire at a rate determined by the intensity of the radiation; a toothed wheel rotatable about an axis; a spring for biasing said toothed wheel; an escapement controlling the stepwise rotation of said toothed wheel; means for moving the escapement through one complete cycle each time said gas discharge tube fires; an alarm circuit; an alarm switch comprising a contact means and an insulating member separating said contact means and operatively connected to said wheel to turn therewith, said insulating member being stepped to provide sections of said insulating member at different radial positions, the arcuate lengths of said sections being different, said contact means closing to energize said alarm circuit when said insulating member no longer separates said contact means; and means for adjusting the radial position of said contact means to dispose different sections of said insulating member therebetween.

19. In a radiation alarm, the combination of: a gas discharge tube providing an output circuit; a prechargeable input capacitor including circuit means for recharging same; an ionization chamber providing a collecting electrode connected to said input capacitor to reduce the charge thereon progressively in response to the radiation reaching said ionization chamber; means for discharging said gas discharge tube when the charge on said input capacitor drops to a predetermined value; and means responsive to discharge of said gas discharge tube for recharging said input capacitor through said circuit means, said last-named means including a relay responsive to the discharge of said gas discharge tube, an escapement providing a pawl arm having two dogs thereon, a toothed wheel advanced step by step by said escapement in synchronism with the discharge of said tube, and contact means operatively associated with said pawl arm and disposed in said circuit means for recharging said input capacitor when said pawl arm is in a predetermined position.

20. In a radiation alarm providing means for integrating incident radiation and periodically producing pulses indicative in number of the total radiation reaching said device, the combination of: an alarm switch; means for closing said alarm switch after the occurrence of a predetermined number of said pulses; an aural alarm; means for connecting said aural alarm to said alarm circuit to produce spaced aural signals synchronized with said pulses; and means for actuating said aural alarm to produce a prolonged signal upon closing of said alarm switch.

21. In a radiation measuring device, the combination of: an input capacitor means comprising a pair of prechargeable input capacitors; an ionization chamber; switch means for selectively connecting said input capacitors to said ionization chamber in different combinations to provide two ranges of radiation integration before said ionization chamber discharges said input capacitor means to a predetermined point; means for recharging said input capacitor means each time said point is reached; a pair of indicating scales; a pair of operatively connected covering members selectively covering at least portions of said scales; and means for operatively connecting said covering members to said switch means.

References Cited in the file of this patent

UNITED STATES PATENTS

| | | |
|---|---|---|
| 2,036,072 | Mutscheller | Mar. 31, 1936 |
| 2,081,074 | Strauss | May 18, 1937 |
| 2,122,222 | Vingerhoets | June 28, 1938 |
| 2,188,159 | Rockwood | Jan. 23, 1940 |
| 2,266,516 | Russell | Dec. 16, 1941 |